(12) United States Patent
Saul et al.

(10) Patent No.: US 9,727,227 B2
(45) Date of Patent: Aug. 8, 2017

(54) MULTI-TOUCH REMOTING

(75) Inventors: Elton Saul, Kirkland, WA (US); Benjamin Meister, Redmond, WA (US); Daniel Keymer, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 461 days.

(21) Appl. No.: 13/193,565

(22) Filed: Jul. 28, 2011

(65) Prior Publication Data

US 2013/0031482 A1    Jan. 31, 2013

(51) Int. Cl.
*G06F 3/0488* (2013.01)
*H04L 29/06* (2006.01)

(52) U.S. Cl.
CPC .... *G06F 3/0488* (2013.01); *G06F 2203/0383* (2013.01); *G06F 2203/04104* (2013.01); *G06F 2203/04808* (2013.01); *H04L 29/06027* (2013.01)

(58) Field of Classification Search
CPC ......... G06F 2203/04808; G06F 3/0488; H04L 29/06027
USPC .................................................. 715/740, 836
See application file for complete search history.

(56) References Cited

U.S. PATENT DOCUMENTS

| | | | |
|---|---|---|---|
| 4,484,179 A * | 11/1984 | Kasday | ........................ 345/176 |
| 6,498,590 B1 * | 12/2002 | Dietz et al. | ................... 343/893 |
| 6,842,777 B1 | 1/2005 | Tuli | |
| 7,030,861 B1 * | 4/2006 | Westerman et al. | .......... 345/173 |
| 7,275,212 B2 | 9/2007 | Leichtling | |
| 7,463,270 B2 * | 12/2008 | Vale et al. | ..................... 345/619 |
| 7,719,523 B2 * | 5/2010 | Hillis | ............................ 345/173 |
| 7,976,372 B2 * | 7/2011 | Baerlocher et al. | ........... 463/12 |
| 8,094,137 B2 * | 1/2012 | Morrison | ...................... 345/175 |
| 8,165,108 B1 * | 4/2012 | Mouilleron | ............ H04W 4/18 370/352 |
| 8,239,785 B2 * | 8/2012 | Hinckley et al. | ............. 715/863 |
| 8,261,213 B2 * | 9/2012 | Hinckley et al. | ............. 715/863 |
| 8,332,523 B2 * | 12/2012 | Weinstock | ........... G06F 3/0227 370/392 |
| 8,416,206 B2 * | 4/2013 | Carpendale et al. | ......... 345/173 |
| 8,433,138 B2 * | 4/2013 | Wang et al. | .................. 382/181 |
| 8,466,879 B2 * | 6/2013 | Townsend et al. | ........... 345/173 |
| 8,473,870 B2 * | 6/2013 | Hinckley et al. | ............. 715/863 |
| 8,502,789 B2 * | 8/2013 | Tse et al. | ...................... 345/173 |

(Continued)

OTHER PUBLICATIONS

TUIO Kaltenbrunner May 2005.*

(Continued)

*Primary Examiner* — Jeffrey A Gaffin
*Assistant Examiner* — John M Heffington

(57) ABSTRACT

An invention is disclosed for using multi-touch input in a remote presentation session. In embodiments of the invention, a client computer is configured to locally receive both mouse and keyboard input, and multi-touch input. Where the client computer receives mouse or keyboard input, it sends this input to a remote presentation session server via a TCP connection. Where the client computer receives multi-touch input, it sends this input to the remote presentation session server via a UDP connection. The server computer processes input received from the client computer, via either the TCP or UDP connection, and sends the client a graphical result of performing processing corresponding to that received input.

20 Claims, 6 Drawing Sheets

(56) References Cited

U.S. PATENT DOCUMENTS

| | | | |
|---|---|---|---|
| 8,539,384 B2* | 9/2013 | Hinckley et al. | 715/863 |
| 8,552,999 B2* | 10/2013 | Dale et al. | 345/173 |
| 8,566,044 B2* | 10/2013 | Shaffer et al. | 702/57 |
| 8,566,045 B2* | 10/2013 | Shaffer et al. | 702/57 |
| 8,612,874 B2* | 12/2013 | Zaman et al. | 715/765 |
| 8,645,827 B2* | 2/2014 | Beaver et al. | 715/702 |
| 8,726,195 B2* | 5/2014 | Bill | 715/863 |
| 8,738,814 B1* | 5/2014 | Cronin | 710/5 |
| 8,745,280 B1* | 6/2014 | Cronin | 710/8 |
| 8,788,951 B2* | 7/2014 | Zalewski et al. | 715/757 |
| 8,860,763 B2* | 10/2014 | Privault et al. | 345/650 |
| 8,904,304 B2* | 12/2014 | Farago | 715/776 |
| 8,924,885 B2* | 12/2014 | LeVee et al. | 715/781 |
| 8,928,727 B1* | 1/2015 | Milligan et al. | 348/14.08 |
| 2003/0139931 A1* | 7/2003 | Park | G06F 3/165 |
| | | | 704/275 |
| 2003/0142038 A1* | 7/2003 | Folk, II | G06F 3/0481 |
| | | | 345/2.1 |
| 2004/0103438 A1* | 5/2004 | Yan | H04L 29/06027 |
| | | | 725/109 |
| 2004/0239681 A1* | 12/2004 | Robotham | G06F 3/14 |
| | | | 345/581 |
| 2005/0044236 A1* | 2/2005 | Stafford | H04L 29/06027 |
| | | | 709/227 |
| 2005/0091571 A1* | 4/2005 | Leichtling | G06F 3/1454 |
| | | | 715/203 |
| 2007/0055694 A1* | 3/2007 | Ruge et al. | 707/104.1 |
| 2007/0115992 A1* | 5/2007 | Weinstock et al. | 370/392 |
| 2008/0201481 A1* | 8/2008 | Patwardhan | H04L 29/06 |
| | | | 709/228 |
| 2008/0204426 A1 | 8/2008 | Hotelling et al. | |
| 2008/0219240 A1* | 9/2008 | Dylag | H04M 1/2473 |
| | | | 370/352 |
| 2008/0280684 A1* | 11/2008 | McBride | A63F 13/12 |
| | | | 463/42 |
| 2009/0150802 A1* | 6/2009 | Do et al. | 715/757 |
| 2009/0225037 A1* | 9/2009 | Williamson et al. | 345/173 |
| 2009/0225038 A1* | 9/2009 | Bolsinga et al. | 345/173 |
| 2009/0225039 A1* | 9/2009 | Williamson et al. | 345/173 |
| 2010/0020025 A1* | 1/2010 | Lemort et al. | 345/173 |
| 2010/0228871 A1* | 9/2010 | Abdo et al. | 709/230 |
| 2010/0251167 A1* | 9/2010 | DeLuca et al. | 715/786 |
| 2010/0269039 A1 | 10/2010 | Pahlavan et al. | |
| 2011/0054296 A1* | 3/2011 | McCarthy | A61B 5/742 |
| | | | 600/407 |
| 2011/0080344 A1* | 4/2011 | Dura et al. | 345/163 |
| 2011/0080360 A1* | 4/2011 | Miller et al. | 345/173 |
| 2011/0080361 A1* | 4/2011 | Miller et al. | 345/173 |
| 2011/0252306 A1* | 10/2011 | Williamson et al. | 715/234 |
| 2011/0252307 A1* | 10/2011 | Williamson et al. | 715/234 |
| 2011/0270991 A1* | 11/2011 | Zawacki | H04L 63/0861 |
| | | | 709/227 |
| 2011/0283188 A1* | 11/2011 | Farrenkopf et al. | 715/702 |
| 2011/0283231 A1* | 11/2011 | Richstein et al. | 715/810 |
| 2012/0005267 A1* | 1/2012 | Chen | G06F 9/4445 |
| | | | 709/203 |
| 2012/0038550 A1* | 2/2012 | Lemmey et al. | 345/156 |
| 2012/0076197 A1* | 3/2012 | Byford | H04N 19/00 |
| | | | 375/240.01 |
| 2012/0092277 A1* | 4/2012 | Momchilov | 715/173 |
| 2012/0166470 A1* | 6/2012 | Baumgaertel et al. | 707/769 |
| 2012/0221929 A1* | 8/2012 | Bolsinga et al. | 715/205 |
| 2012/0262379 A1* | 10/2012 | King | G06F 3/1454 |
| | | | 345/173 |
| 2012/0266068 A1* | 10/2012 | Ryman et al. | 715/719 |
| 2014/0331145 A1* | 11/2014 | Schoenefeld | 715/740 |
| 2014/0380182 A1* | 12/2014 | Lu et al. | 715/740 |

OTHER PUBLICATIONS

Phase Five Systems, "Jump Desktop (Remote Desktop)" Jan. 4, 2010, 4 pages.

"Panasonic's EZ Touch Multi-touch Remote Control Concept Hands-On and Video", http://www.crazyengineers.com/forum/ce-infocus/5588-panasonics-ez-touch-multitouch-remote-control-concept-hands-video.html, accessed May 10, 2011, 2 pages.

"Remote Desktop Client for Android", http://www.xtralogic.com/rdpclient.shtml, accessed May 10, 2011, 13 pages.

Forlines et al., "HybridPointing: Fluid Switching Between Absolute and Relative Pointing with a Direct Input Device", UIST '06 Proceedings of the 19th annual ACM symposium on User interface software and technology, Oct. 15-18, 2006, 211-220.

Hartmann et al., "Augmenting Interactive Tables with Mice & Keyboards", UIST '09 Proceedings of the 22nd annual ACM symposium on User interface software and technology, Oct. 4-7, 2008, 4 pages.

* cited by examiner

MULTI-TOUCH REMOTING

BACKGROUND

In a remote presentation session, a client computer and a server computer communicate across a communications network. The client sends the server locally-received input, such as mouse cursor movements and keyboard presses. In turn, the server receives this input and performs processing associated with it, such as executing an application in a user session. When the server performs processing that results in output, such as graphical output or sound, the server sends this output to the client for presentation. In this manner, applications appear to a user of the client to execute locally on the client when, they in fact, execute on the server.

While there are known techniques for providing certain kinds of input, such as mouse cursor movements and keyboard movements in remote presentation sessions, there are also many problems with providing input in a remote presentation session, some of which are well known.

SUMMARY

One problem with providing input in a remote presentation session is that there is no mechanism for providing multi-touch input. As used herein, multi-touch input may be input provided by a user to a computer system through touching a touch-sensitive surface, such as with his or her finger(s), or a stylus. An example of this touch-sensitive surface is a track pad, like those found in many laptop computers, in which a user moves his finger along a surface, and those finger movements are reflected as single cursor or pointer movements on a display device. Another example of this touch-sensitive surface is a touch screen, like those found in some mobile telephones, where a touch-sensitive surface is integrated into a display device, and in which a user moves his finger along the display device itself, and those finger movements are interpreted as input to the computer.

Multi-touch input may be distinguished from touch input, such as that made with a single stylus. Touch input is represented internally by a computer the same as mouse input—usually merely a coordinate, whereas multi-touch is represented by a computer as one or more contacts that are individually identified and updated. Multi-touch input may be distinguished from mouse input. A mouse is responsive to user movements (either movement of the mouse itself, or a press of a button on the mouse), but a mouse is not responsive to merely being touched by a user.

Embodiments of the invention allow for the use of multi-touch input in a remote presentation session. In embodiments, a client computer and a server computer conduct a remote presentation session with each other. The client computer receives multi-touch input indicative of a user touching a touch-sensitive input device attached locally to the client computer. The client computer then sends an encoded representation of the multi-touch input to a process executing in the user session of the server computer via a User Datagram Protocol (UDP) connection (in other embodiments, the client sends this encoded representation of the multi-touch input via a Transmission Control Protocol (TCP) connection), and the server performs processing corresponding to the multi-touch input. The server then sends a graphical output from performing processing corresponding to the multi-touch input to the client via the remote presentation session, and the client displays this output locally.

The client also receives input indicative of mouse, keyboard, or pen input made locally to the client computer. The client computer sends an indication of this mouse, keyboard, or pen input to a process executing in system space of the server computer via the TCP connection, the process executing in system space injecting the second input into the user session. The server performs processing corresponding to this second input. The server then sends a graphical output from performing processing corresponding to this second input to the client via the remote presentation session, and the client displays it locally.

DETAILED DESCRIPTION OF ILLUSTRATIVE EMBODIMENTS

Figure 1:
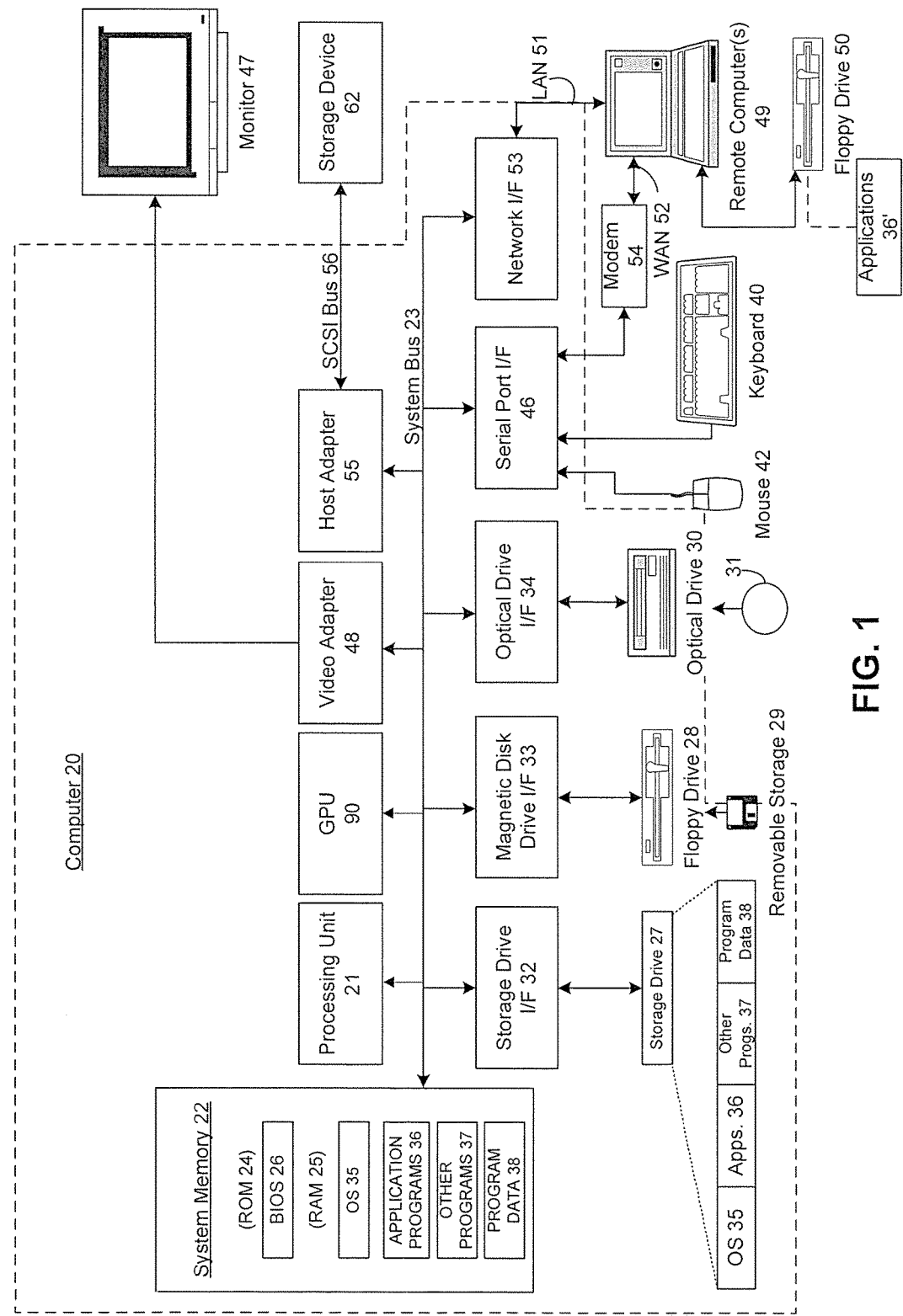
FIG. 1 depicts an example general purpose computing environment in which embodiments of the invention may be implemented.

Embodiments of the invention may execute on one or more computer systems. FIG. 1 and the following discussion are intended to provide a brief general description of a suitable computing environment in which embodiments of the invention may be implemented.

FIG. 1 depicts an example general purpose computing system. The general purpose computing system may include a conventional computer 20 or the like, including processing unit 21. Processing unit 21 may comprise one or more processors, each of which may have one or more processing cores. A multi-core processor, as processors that have more than one processing core are frequently called, comprises multiple processors contained within a single chip package.

Computer 20 may also comprise graphics processing unit (GPU) 90. GPU 90 is a specialized microprocessor optimized to manipulate computer graphics. Processing unit 21 may offload work to GPU 90. GPU 90 may have its own graphics memory, and/or may have access to a portion of system memory 22. As with processing unit 21, GPU 90 may comprise one or more processing units, each having one or more cores.

Computer 20 may also comprise a system memory 22, and a system bus 23 that communicative couples various system components including the system memory 22 to the processing unit 21 when the system is in an operational state. The system memory 22 can include read only memory (ROM) 24 and random access memory (RAM) 25. A basic input/output system 26 (BIOS), containing the basic routines that help to transfer information between elements within the computer 20, such as during start up, is stored in ROM 24. The system bus 23 may be any of several types of bus structures including a memory bus or memory controller, a peripheral bus, or a local bus, which implements any of a variety of bus architectures. Coupled to system bus 23 may be a direct memory access (DMA) controller 80 that is configured to read from and/or write to memory independently of processing unit 21. Additionally, devices connected to system bus 23, such as storage drive interface 32 or magnetic disk drive interface 33 may be configured to also read from and/or write to memory independently of processing unit 21, without the use of DMA controller 80.

The computer 20 may further include a storage drive 27 for reading from and writing to a hard disk (not shown) or a solid-state disk (SSD) (not shown), a magnetic disk drive 28 for reading from or writing to a removable magnetic disk 29, and an optical disk drive 30 for reading from or writing to a removable optical disk 31 such as a CD ROM or other optical media. The hard disk drive 27, magnetic disk drive 28, and optical disk drive 30 are shown as connected to the system bus 23 by a hard disk drive interface 32, a magnetic disk drive interface 33, and an optical drive interface 34, respectively. The drives and their associated computer-readable storage media provide non-volatile storage of computer readable instructions, data structures, program modules and other data for the computer 20.

Although the example environment described herein employs a hard disk, a removable magnetic disk 29 and a removable optical disk 31, it should be appreciated by those skilled in the art that other types of computer readable media which can store data that is accessible by a computer, such as flash memory cards, digital video discs or digital versatile discs (DVDs), random access memories (RAMs), read only memories (ROMs) and the like may also be used in the example operating environment. Generally, such computer readable storage media can be used in some embodiments to store processor executable instructions embodying aspects of the present disclosure. Computer 20 may also comprise a host adapter 55 that connects to a storage device 62 via a small computer system interface (SCSI) bus 56.

A number of program modules comprising computer-readable instructions may be stored on computer-readable media such as the hard disk, magnetic disk 29, optical disk 31, ROM 24 or RAM 25, including an operating system 35, one or more application programs 36, other program modules 37, and program data 38. Upon execution by the processing unit, the computer-readable instructions cause actions described in more detail below to be carried out or cause the various program modules to be instantiated. A user may enter commands and information into the computer 20 through input devices such as a keyboard 40 and pointing device 42. Other input devices (not shown) may include a microphone, joystick, game pad, satellite disk, scanner or the like. These and other input devices are often connected to the processing unit 21 through a serial port interface 46 that is coupled to the system bus, but may be connected by other interfaces, such as a parallel port, game port or universal serial bus (USB). A display 47 or other type of display device can also be connected to the system bus 23 via an interface, such as a video adapter 48. In embodiments, display 47 may comprise a touch-sensitive surface, to which multi-touch input may be made. In addition to the display 47, computers typically include other peripheral output devices (not shown), such as speakers and printers.

The computer 20 may operate in a networked environment using logical connections to one or more remote computers, such as a remote computer 49. The remote computer 49 may be another computer, a server, a router, a network PC, a peer device or other common network node, and typically can include many or all of the elements described above relative to the computer 20, although only a memory storage device 50 has been illustrated in FIG. 1. The logical connections depicted in FIG. 1 can include a local area network (LAN) 51 and a wide area network (WAN) 52. Such networking environments are commonplace in offices, enterprise wide computer networks, intranets and the Internet.

When used in a LAN networking environment, the computer 20 can be connected to the LAN 51 through a network interface or adapter 53. When used in a WAN networking environment, the computer 20 can typically include a modem 54 or other means for establishing communications over the wide area network 52, such as the INTERNET. The modem 54, which may be internal or external, can be connected to the system bus 23 via the serial port interface 46. In a networked environment, program modules depicted relative to the computer 20, or portions thereof, may be stored in the remote memory storage device. It will be appreciated that the network connections shown are exemplary and other means of establishing a communications link between the computers may be used.

In an embodiment where computer 20 is configured to operate in a networked environment, OS 35 is stored remotely on a network, and computer 20 may netboot this remotely-stored OS rather than booting from a locally-stored OS. In an embodiment, computer 20 comprises a thin client where OS 35 is less than a full OS, but rather a kernel that is configured to handle networking and display output, such as on monitor 47.

Figure 2:
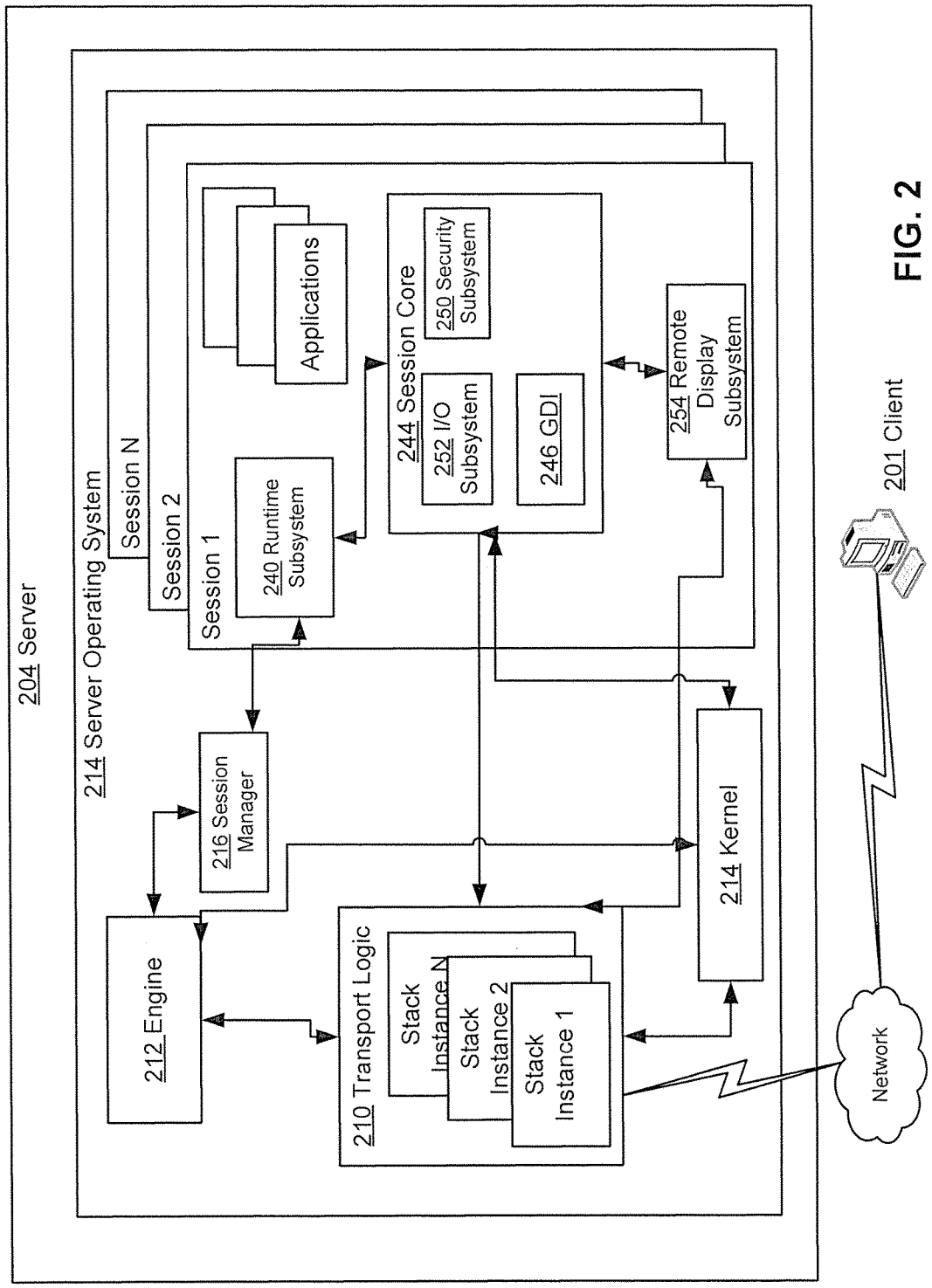
FIG. 2 depicts an example remote presentation session server in which embodiments of the invention may be implemented.

FIG. 2 generally illustrates an example environment wherein aspects of the present invention can be implemented. For instance, the server 204 may implement the operational procedures of FIG. 6. One skilled in the art can appreciate that the example elements depicted by FIG. 2 are illustrated to provide an operational framework for describing the present invention. Accordingly, in some embodiments the physical layout of each environment may be different depending on different implementation schemes. Thus the example operational framework is to be treated as illustrative only and in no way limit the scope of the claims.

Depicted in FIG. 2 is server 204, which may include circuitry configured to effectuate a remote presentation session server, or in other embodiments the server 204 can include circuitry configured to support remote desktop connections. In the depicted example, the server 204 can be configured to generate one or more sessions for connecting clients such as sessions 1 through N (where N is an integer greater than 2). Briefly, a session in example embodiments of the present invention can generally include an operational environment that is effectuated by a plurality of subsystems, e.g., software code, that are configured to interact with a kernel 214 of server 204. For example, a session can include a process that instantiates a user interface such as a desktop window, the subsystems that track mouse movement within the window, the subsystems that translate a mouse click on an icon into commands that effectuate an instance of a program, etc. A session can be generated by the server 204 on a user by user basis by the server 204 when, for example, the server 204 receives a connection request over a network connection from a client 201. Generally, a connection request can first be handled by the transport logic 210 that can, for example, be effectuated by circuitry of the server 204. The transport logic 210 can in some embodiments include a network adaptor; firmware, and software that can be configured to receive connection messages and forward them to the engine 212. As illustrated by FIG. 2, the transport logic 210 can in some embodiments include protocol stack instances for each session. Generally, each protocol stack instance can be configured to route user interface output to a client and route user input received from the client to the session core 244 associated with its session.

Continuing with the general description of FIG. 2, the engine 212 in some example embodiments of the present invention can be configured to process requests for sessions; determine the functionality for each session; generate sessions by allocating a set of physical resources for the session; and instantiating a protocol stack instance for the session. In some embodiments the engine 212 can be effectuated by specialized circuitry components that can implement some of the above mentioned operational procedures. For example, the circuitry in some example embodiments can include memory and a processor that is configured to execute code that effectuates the engine 212. As depicted by FIG. 2, in some instances the engine 212 can receive connection requests and determine that, for example, a license is available and a session can be generated for the request. In the situation where the server 204 is a remote computer that includes remote desktop capabilities, the engine 212 can be configured to generate a session in response to a connection request without checking for a license. As illustrated by FIG. 2, a session manager 216 can be configured to receive a message from an engine 212 and in response to the message the session manager 216 can add a session identifier to a table; assign memory to the session identifier; and generate system environment variables and instances of subsystem processes in memory assigned to the session identifier.

As illustrated by FIG. 2, the session manager 216 can instantiate environment subsystems such as a runtime subsystem 240 that can include a kernel mode part such as the session core 244. For example, the environment subsystems in an embodiment are configured to expose some subset of services to application programs and provide an access point to the kernel of the operating system 214. In example embodiments the runtime subsystem 240 can control the execution of processes and threads and the session core 244 can send requests to the executive of the kernel 214 to allocate memory for the threads and schedule time for them to be executed. In an embodiment the session core 244 can include a graphics display interface 246 (GDI), a security subsystem 250, and an input subsystem 252. The input subsystem 252 can in these embodiments be configured to receive user input from a client 201 via the protocol stack instance associated with the session and transmit the input to the session core 244 for the appropriate session. The user input can in some embodiments include signals indicative of absolute and/or relative mouse movement commands, mouse coordinates, mouse clicks, keyboard signals, joystick movement signals, etc. User input, for example, a mouse double-click on an icon, can be received by the session core 244 and the input subsystem 252 can be configured to determine that an icon is located at the coordinates associated with the double-click. The input subsystem 252 can then be configured to send a notification to the runtime subsystem 240 that can execute a process for the application associated with the icon.

In addition to receiving input from a client 201, draw commands can be received from applications and/or a desktop and be processed by the GDI 246. The GDI 246 in general can include a process that can generate graphical object draw commands. The GDI 246 in this example embodiment can be configured to pass its output to the remote display subsystem 254 where the commands are formatted for the display driver that is attached to the session. In certain example embodiments one or more physical displays can be attached to the server 204, e.g., in a remote desktop situation. In these example embodiments the remote display subsystem 254 can be configured to mirror the draw commands that are rendered by the display driver(s) of the remote computer system and transmit the mirrored information to the client 201 via a stack instance associated with the session. In another example embodiment, where the server 204 is a remote presentation session server, the remote display subsystem 254 can be configured to include virtual display driver(s) that may not be associated with displays physically attached to the server 204, e.g., the server 204 could be running headless. The remote display subsystem 254 in this embodiment can be configured to receive draw commands for one or more virtual displays and transmit them to the client 201 via a stack instance associated with the session. In an embodiment of the present invention, the remote display subsystem 254 can be configured to determine the display resolution for each display driver, e,g., determine the display resolution of the virtual display driver(s) associated with virtual displays or the display resolution of the display drivers associated with physical displays; and route the packets to the client 201 via the associated protocol stack instance.

In some example embodiments the session manager 216 can additionally instantiate an instance of a logon process associated with the session identifier of the session that can be configured to handle logon and logoff for the session. In these example embodiments drawing commands indicative of the graphical user interface associated with the logon process can be transmitted to the client 201 where a user of the client 201 can input an account identifier, e.g., a username/password combination, a smart card identifier, and/or biometric information into a logon screen. The information can be transmitted to server 204 and routed to the engine 212 and the security subsystem 250 of the session core 244. For example, in certain example embodiments the engine 212 can be configured to determine whether the user account is associated with a license; and the security subsystem 250 can be configured to generate a security token for the session.

Figure 3:
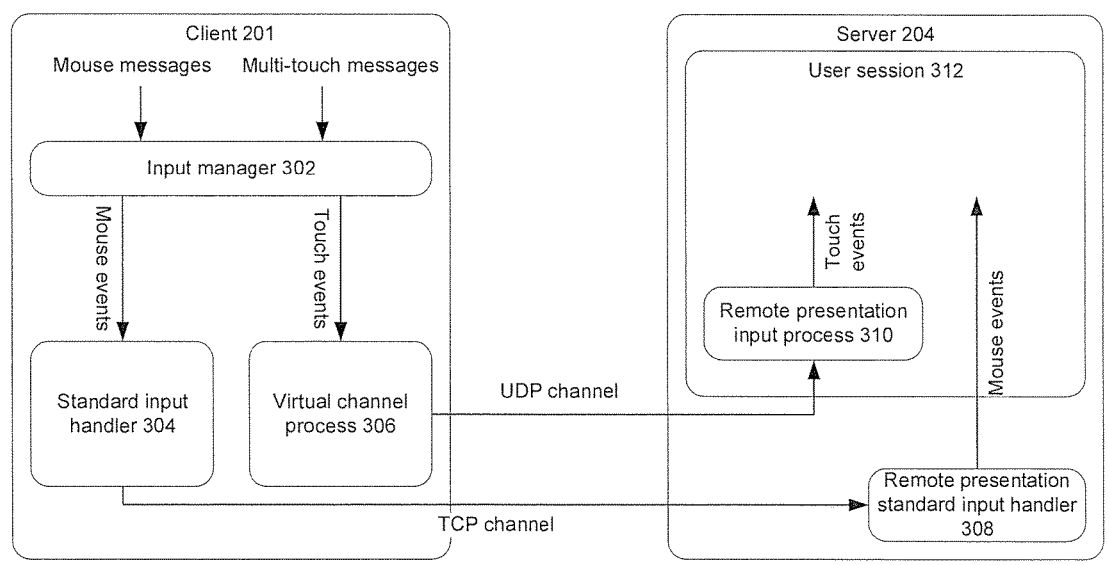
FIG. 3 depicts an example architecture of the input systems of a remote presentation session client and server in which embodiments of the invention may be implemented.

FIG. 3 depicts an example architecture of the input systems of a remote presentation session client and server in which embodiments of the invention may be implemented. The remote presentation session client may be implemented in client 201 of FIG. 2, and the remote presentation session server may be implemented in server 204 of FIG. 2. The system architecture of both client 201 and server 204 is similar to that of versions of the MICROSOFT WINDOWS operating system. Client 201 and server 204 are configured to conduct a remote presentation session with each other. As depicted, server 204 serves a remote presentation session to client 201 where server 204 sends client graphical output from executing user session 312.

In the course of a remote presentation session, client 201 may receive input from a user. This input may comprise mouse and keyboard input and multi-touch input. Both mouse input and multi-touch input are received at client 201 and converted to input messages, and then sent to input manager 302 (which may be MICROSOFT WIN32 Input PAL in versions of the MICROSOFT WINDOWS operating system).

Upon receiving a mouse message, input manager 302 will send a corresponding mouse event to standard input handler 304 (such as Core Input Handler in versions of the MICROSOFT WINDOWS operating system) to encode and send the message over a TCP (Transmission Control Protocol) connection (such as a MCS I/O channel in versions of the MICROSOFT WINDOWS operating system) to remote presentation standard input handler 308 (such as Terminpt-.sys in versions of the MICROSOFT WINDOWS operating system) on server 204. Remote presentation standard input handler 308 executes on server 204 in system space, rather than session space, such as the session space of user session 312. Remote presentation standard input handler 308 injects the received mouse event into user session 312 (such as an application executing in user session 312 to which the mouse input is directed), where it is processed by user session 312.

In contrast to mouse messages, upon receiving a multi-touch message, input manager 302 will send a corresponding multi-touch event to virtual channel process 306 to encode and send the message over a RDP input channel to remote presentation input process 310 (such as RDPinput.exe in versions of the MICROSOFT WINDOWS operating system) on server 204. Virtual channel process 306 may request from input manager 302 all touch frames associated with the contacts that are currently in range, including those that have not yet been sent to server 204. These frames may then be processed, and sent to server 204 in chronological order. Processing the frames may involve (a) removing duplicate frames; (b) remapping the identifier of each contact in a frame from a larger address space to a smaller address space; (c) converting a system absolute timestamp in each frame to a relative timestamp—relative to when the transaction was initiated; and (d) removing superfluous fields not required by the server. Once the frames are processed, virtual channel process 306 may wire encode the frames—bit-field encoding the fields to remove unused bytes.

Remote presentation input process 310 executes on server 204 in the session space of the session with which client 201 conducts the remote presentation session—user session 312. Remote presentation input process 310 injects the received multi-touch event into user session 312 (such as an application executing in user session 312 to which the multi-touch input is directed), where it is processed. Remote presentation input process 310 may remove contacts greater than a maximum allowable number of permitted "in range" contacts prior to injecting them into the frame. Remote presentation input process 310 may also calculate the correct absolute time of injection by converting the relative timestamp in the frame to an absolute one (based on the absolute time of the injection of the first frame in the touch transaction).

As described above, virtual channel process 306 may filter out duplicate frames and not send them to server 204, so there is a possibility that server 204 may not receive touch input for some time, even though a touch transaction is in process (this may happen where a user stops moving his or her fingers over the touch surface, but remains in contact with the touch surface). If server 204 does not inject input at a regular rate, the associated touch transaction may be cancelled by a system input handler of server 204. To overcome this, server 204 may store the most recently received touch frame, and re-inject it into user session 312 at regular intervals as a touch update. This ensures that the touch transaction remains in an active state.

There may be scenarios where injection of touch input in server 204 is not possible or allowed, but the injection of mouse input is possible or allowed. A scenario where this may be the case is where the user has switched to a "secure desktop" to change his or her password. Remote presentation input process 310 may not be able to inject input to a secure desktop because the secure desktop is running as a high-privilege system application. In such a situation, server 204 may send client 201 an instruction to send mouse input instead of touch. Client 201 may then reduce multi-touch input to one point of contact (such as a center point of the multiple touches), and convert that input to mouse messages, which it sends to server 204 via standard input handler 304.

In response to processing either mouse or multi-touch input, server 204 may produce a graphical result, and send that graphical result to client 201 via the remote presentation session, where client 201 displays the graphical result locally.

Figure 4:
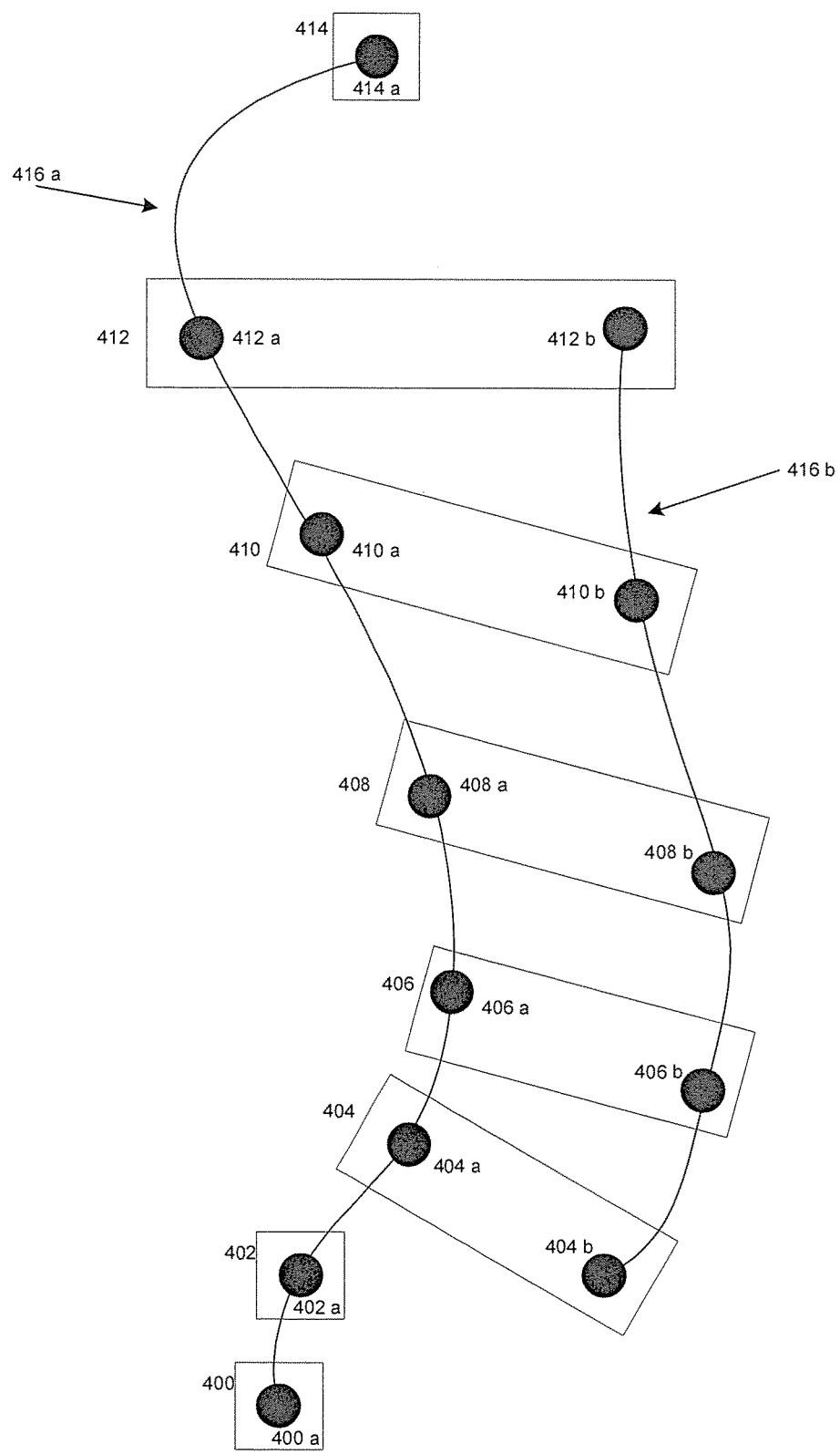
FIG. 4 depicts example multi-touch input received by a client that is sent to a server in a remote presentation session.

FIG. 4 depicts example multi-touch input received by a client that is sent to a server in a remote presentation session. For instance, the multi-touch input depicted in FIG. 4, may be received by client 201 of FIG. 2 and sent to server 204 of FIG. 2 via a remote presentation session, in accordance with embodiments of the invention.

As depicted, a user contacts a multi-touch input surface with two fingers, which trace out lines 416a and 416b, respectively. As this input is made, the invention captures time slices of it in the form of frames. Frame 400 captures input 400a, frame 402 captures input 402a, frame 404 captures input 404a and 404b, frame 406 comprises input 406a and 406b, frame 408 comprises input 408a and 408b, frame 410 comprises input 410a and 410b, frame 412 comprises input 412a and 412b, and frame 414 comprises input 414a.

When a user makes contact with a portion of a multi-touch surface that controls an application (such as a remote presentation session application executing on client 201), the system sends that application a DOWN message, and the multi-touch contact is assigned an identification so that it may be recognized in subsequent updates. When the multi-touch contact moves, the application receives UPDATE messages, and, when the contact is broken, the application receives a UP message. Even if a multi-touch contact does not move, if a down event took place, the application will still receive a UPDATE message.

As depicted in FIG. 4, there are eight multi-touch frames, 400-414. User multi-touch 416a first comes into contact with the multi-touch surface, and is assigned the identification of TouchContact0. User input point 416b then comes into contact with the touch surface, and is assigned the identification of TouchContact1. The touch frames 400-414 are then

400 (TouchContact0, DOWN)
    402 (TouchContact0, UPDATE)
    404 (TouchContact0, UPDATE); (TouchContact1, DOWN)
    406 (TouchContact0, UPDATE); (TouchContact1, UPDATE)
    408 (TouchContact0, UPDATE); (TouchContact1, UPDATE)
    410 (TouchContact0, UPDATE); (TouchContact1, UPDATE)
    412 (TouchContact0, UPDATE); (TouchContact1, UP)
    414 (TouchContact0, UP)

As depicted, frame 400 contains an UP message for TouchContact0, because this is the first contact that TouchContact0 has made. Frame 400 contains no message for TouchContact1 because there is no multi-touch for TouchContact1 contained within frame 400. Frame 402 contains an UPDATE message for TouchContact0, since the touch is still in contact, and no message for TouchContact1 because there is no multi-touch for TouchContact1. Frame 404 contains another UDPATE message for TouchContact0, and a DOWN message for TouchContact1, to signify that Touch-Contact1 has begun. Frames 406, 408 and 410 all contain an UDPATE message for both TouchContact0 and TouchContact1. When frame 412 is taken, it is determined that TouchContact1 has been broken, and an UP message is sent. Finally, frame 414 contains an UP message for TouchContact0 and no message for TouchContact1 since there has been no DOWN message since the UP message.

Figure 5:
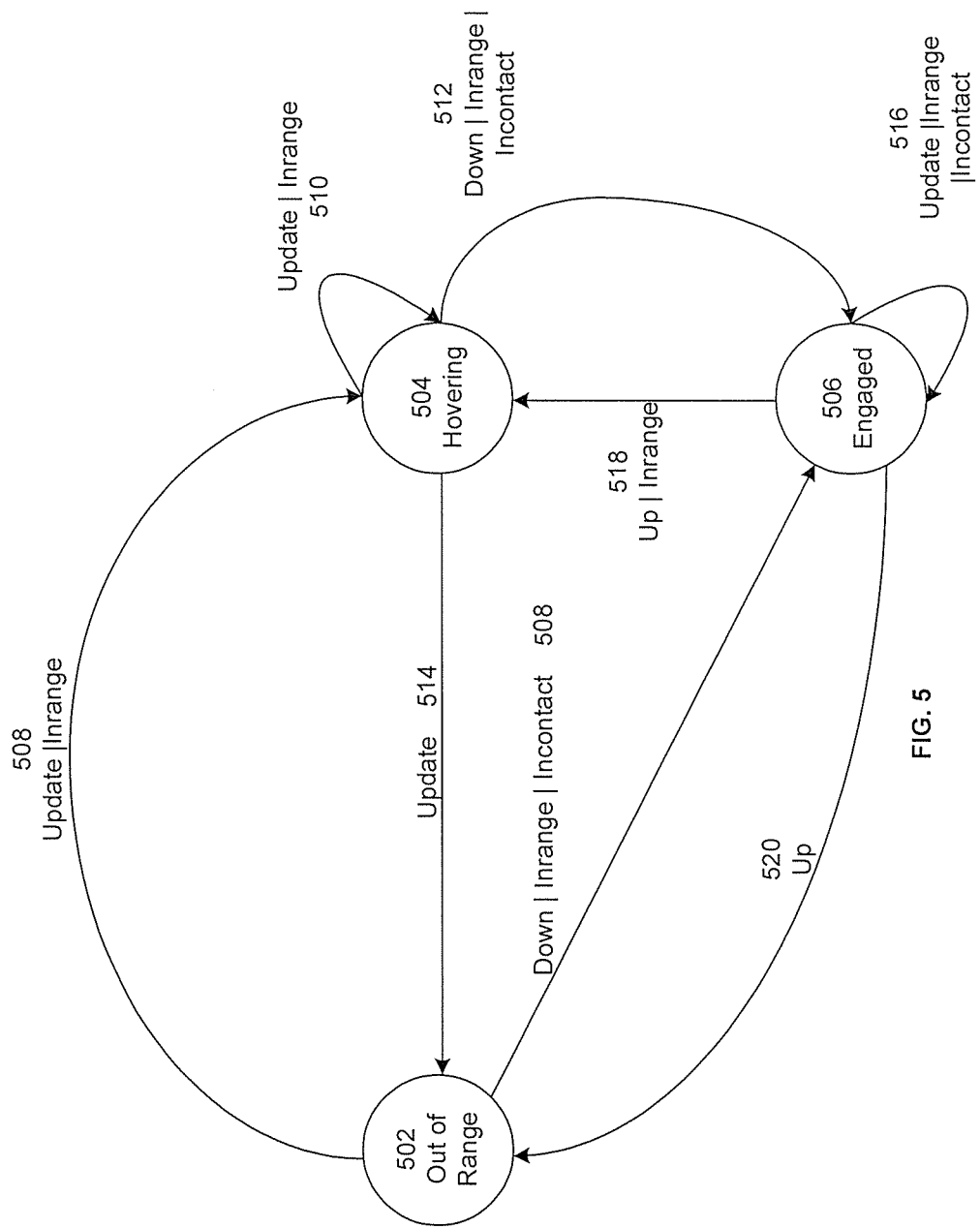
FIG. 5 depicts a state diagram of a three-state multi-touch input system, such as is used for multi-touch input in embodiments of the invention.

FIG. 5 depicts a state diagram of a three-state multi-touch input system. The state diagram of FIG. 5 may be used to quantify the transitions between multi-touch input that is sent to a server in a remote presentation session, as depicted in FIG. 4.

In embodiments, multi-touch input is a two-state system—the multi-touch may either be engaged or out of range (e.g., out of range). FIG. 5 depicts a three-state system of multi-touch input that also incorporates a hover state 504. When multi-touch input is out of range 502, any received multi-touch input is outside of an area where it is interpreted as affecting a user interface element displayed by the system. An out of range state 502 may transition 508 to hovering state 504 via an update/in-range change. In hovering state 504, the multi-touch input is in-range of a user interface element, but is not actively engaged with the user interface element (similar to how a mouse cursor may hover over a user interface element, without a corresponding button click that actively engages with that user interface element). An update change means that the input has updated somehow—e.g. its position has moved. An in-range change means that the input is now in range of an area where it is interpreted as affecting a user interface element displayed by the system.

An out of range state 502 may also transition 508 to an engaged state 506. In an engaged state, multi-touch input is both in range of a user interface element and actively engaged with it (similar to how a mouse cursor may interact with a user interface element when a corresponding button push is made to click on that user interface element). An out of range state 502 may transition to an engaged state 506 via a down/in-range/in-contact change. A down change means that the multi-touch input is actively engaging the user interface element (similar to a mouse click). An in contact update means that time has passed and upon polling the contact again, it is still in contact, though it may have moved is position.

A hovering state 504 may transition back to that hovering state 504, or to an out of range state 502 or an engaged state 506. A hovering state 504 may transition 510 back to itself upon receiving an update/in-range change. A hovering state 504 may also transition 514 to an out of range 502 state upon receiving an update change, but one that does not denote that the multi-touch input remains in range. A hovering state 504 may transition 512 to an engaged state 506 upon receiving a down/in-range/in-contact update.

Like hovering state 504, engaged state 506 may transition to any other state, including itself. An engaged state 506 may transition 516 back to itself upon receiving an update/in-range/in-contact change 516. An engaged state 506 may transition 518 to a hovering state 504 upon receipt of an up/in-range change. An update change is the opposite of a down change—it means that the multi-touch input was actively engaging the user interface element, but is no longer doing so (similar to releasing a mouse click). An engaged state 506 may transition 520 to an out of range state upon receiving of an up transition.

Figure 6:
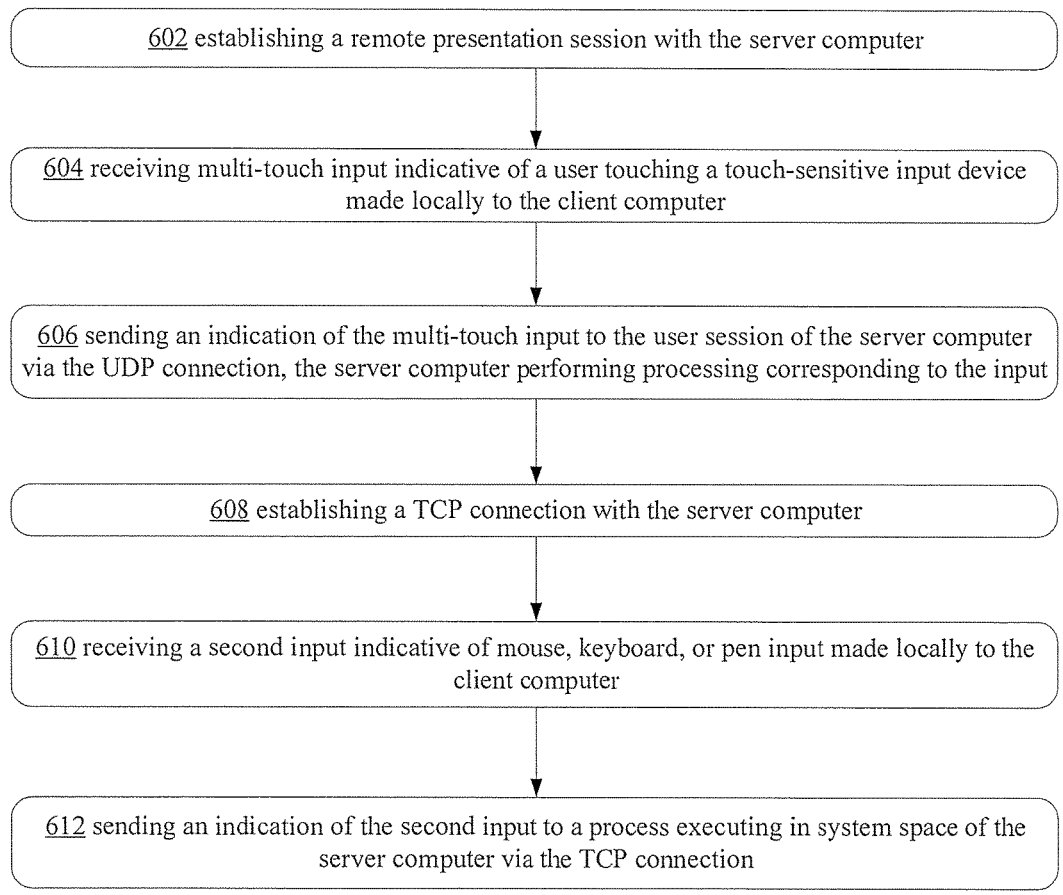
FIG. 6 depicts example operational procedures for multi-touch remoting.

FIG. 6 depicts example operational procedures for multi-touch remoting. The operational procedures of FIG. 6 may be performed by a remote presentation client computer, such as client 201 of FIG. 2, that is configured to communicate with a remote presentation server computer, such as server 204 of FIG. 2. It may be appreciated that there are embodiments of the invention that do not implement all of the operations depicted in FIG. 6, or that implement some or all of the operations depicted in FIG. 6 in a different order than is depicted.

Operation 602 depicts establishing a remote presentation session with the server computer. This may comprise, for instance, the client computer executing a remote presentation session application that transmits user credentials of a login and a password to the server computer. In establishing a remote presentation session, the server computer may disable graphical multi-touch feedback on the server computer. Such graphical multi-touch feedback may comprise, for instance, a "halo" around a location on screen corresponding to where the multi-touch input is directed, or a "tail" that trails the location on screen corresponding to where the multi-touch input is directed, as that location moves. The server may disable graphical multi-touch feedback, for instance, because it is more difficult to encode for transmission in the remote presentation session than graphical data that does not include this graphical multi-touch feedback. In embodiments, the client itself implements graphical multi-touch feedback layered on top of the graphical data received in the remote presentation session so that the user is still able to see such graphical multi-touch feedback.

In embodiments, operation 602 includes sending, by the client computer, an indication that the client computer supports multi-touch input, the server computer initializing the process in the user session in response to receiving the indication that the client computer supports multi-touch input. It may be that the server computer is configured to serve remote presentation sessions both to clients that are and are not configured to support multi-touch input. In such embodiments, a client that is configured to support multi-touch input may send an indication of such to the server, so that the server may modify any settings or execute any computer code in support of processing multi-touch input received from the client.

Operation 604 depicts receiving multi-touch input indicative of a user multi-touching a multi-touch-sensitive input device made locally to the client computer. This input received in operation 604 may be similar to the multi-touch input described with respect to FIG. 4.

In embodiments, the multi-touch input includes an indication of a pressure with which the user multi-touched the multi-touch-sensitive input device. The multi-touch surface to which multi-touch input is applied may be pressure-sensitive, and configured to measure the amount of pressure that the input is applied with. Where the multi-touch surface is so configured, an indication of this pressure may be received by the client in the course of sending the server multi-touch input as part of the remote presentation session.

In embodiments, the multi-touch input includes an indication of an orientation with which the user multi-touched the multi-touch-sensitive input device. For instance, where the input is a finger or finger tip, it may be applied with an orientation—a direction that the finger tip is pointing when the multi-touch input is made. Where the multi-touch surface to which this input is made is configured to determine this orientation, the client may receive an indication of this orientation.

In embodiments, the multi-touch input includes an indication of a rectangular area that bounds a contact point of the user on the multi-touch-sensitive input device. In embodiments, the rectangular area may be oriented with the orientation—e.g. one side of the rectangular area is perpendicular to a direction pointed to by the finger tip. In embodiments, the rectangular area may be a minimum bounding box—a rectangular area that encompasses the contact point of the user on the multi-touch sensitive input device, such that no smaller rectangle exists that encompasses the contact point of the user on the multi-touch sensitive input device. In embodiments where the user makes contact with the multi-touch sensitive input device using a plurality of fingers, a bounding rectangular area may be determined for each such contact point.

In embodiments where the multi-touch input comprises a plurality of contacts, operation 604 may comprise mapping each contact from a first address space to a second address space, the second address space being smaller than the first address space. To save space, the contacts may be mapped from a larger address space (e.g., one represented with 32 bits) to a smaller address space (e.g., one represented with 8 bits). This may then reduce the amount of bandwidth required to send the information to the server.

In embodiments where the contacts are mapped from a first address to a second address space, operation 604 may comprise, in response to determining that the number of contacts in the plurality of contacts is greater than a maximum number of contacts to be sent to the server in the remote presentation session, determining to send no more than an indication of a number of contacts equal to the maximum number to the server. For instance, there may be a setting that allows no more than 10 multi-touch contacts to be remoted to the server. Where 11 multi-touch contacts are detected as input, one of the 11 multi-touch contacts may be disregarded, and only 10 of the multi-touch contacts are then remoted to the server. Determining which multi-touch contact to disregard or drop may be performed as follows. In an example, the client detects multi-touch contacts and begins assigning each contact an identifier. When it has assigned the maximum number of contacts to be remoted an identifier, it may determine that these are the contacts that are to be remoted to the server, and that any additionally detected contacts above the maximum number will not be remoted to the server.

In embodiments where the multi-touch input comprises a plurality of frames, operation 604 may comprise marking each frame of the plurality of frames with a relative timestamp indicative of a time at which the frame of input was made by the user. In embodiments, this relative stamp may indicate a time at which the frame of input was made by the user relative to when the most recent frame of the plurality of frames was made by the user, or when the oldest frame of the plurality of frames was made by the user. For instance, where there are four frames, the most recently received frame may be assigned a time of zero, and the other three frames may be assigned a time relative to that zero (e.g. −2 ms, −4 ms, and −5 ms). Frames may be assigned a relative time stamp—one that is relative to the most recent frame—because the server, upon receiving these frames with some latency introduced via transmission, may otherwise treat the data as if it has already happened in the past.

In embodiments, marking each frame of the plurality of frames with a relative timestamp may comprise replacing an absolute timestamp of each frame with the relative timestamp. A frame may be received with an absolute time stamp representing when this data was input. Where relative timestamps are to be used by the server, it may be unnecessary to also store an absolute time stamp, and it may be replaced with the relative timestamp.

Operation 606 depicts sending an indication of the multi-touch input to the user session of the server computer via a UDP (User Datagram Protocol) connection, the server computer performing processing corresponding to the input. In embodiments of UDP, a UDP connection may be established using an encrypted handshaking phase between two computers, such as the server and the client. While UDP is generally an unreliable protocol, in embodiments forward error correcting codes may be inserted into UDP datagrams to protect against corruption of the datagrams during transmission, and packet reassembly may be performed at the receiving endpoint (such as the client), thereby making the UDP connection reliable. As used in the present invention, it may be advantageous to employ UDP in transmitting multi-touch data because the data is time-sensitive, and UDP may provide a higher throughput than TCP.

The server computer may perform processing corresponding to the input, such as injecting the input into a user session of the remote presentation session, and performing any additional processing corresponding to that input being made. Where this processing corresponding to the input results in generating additional graphical output, the server computer may send this graphical output to the client computer across the remote presentation session.

In embodiments, the multi-touch input may comprise a plurality of frames of multi-touch data. In such embodiments, operation 606 may comprise determining that the multi-touch input indicated by two consecutive frames of the plurality of frames is identical, and sending an indication of only one of the two consecutive frames. For instance, one of the frames of the multi-touch data may be an UPDATE frame that indicates that no contacts have moved. Where this is the case, bandwidth may be conserved by not sending these identical, or redundant frames. As used herein, the frames are referred to as identical, though where they include time stamps, the time indicated by the time stamps may differ.

In embodiments where operation 606 comprises sending an indication of only one of the two consecutive frames, the server computer may inject a keep alive indication into the user session in response to determining that a period of time since a time indicated by a frame of the plurality of frames is above a threshold. In embodiments, an application executing on the server that is being injected with multi-touch data received from the client may interpret the lack of an UPDATE for some period of time to mean that the contact has been broken, and the multi-touch input ended. This situation may be encountered in embodiments where the client does not send identical, or redundant, frames to the server. In such embodiments, the server may then inject a keep alive indication (for example, an UPDATE where no movement of the multi-touch contacts occurs) into the application, to prevent the application from determining that the contact has ended for some reason. This keep alive injection may be made, for instance, at the expiration of a timer that is reset when a frame received from the client is injected into the application.

In embodiments where the multi-touch input comprises a plurality of frames, operation 606 comprises determining a field of each frame of the plurality of frames not needed by the server computer to process the multi-touch input; and removing, by the client computer, the field from each frame. In embodiments where the multi-touch input comprises a plurality of frames, operation 606 comprises determining that the field of the frame represents the same value as the field of a frame possessed by the server computer; and removing, by the client computer, the field from the frame before sending the indication of the input to the process executing in the user session of the server computer. Each frame may contain fields or data that are superfluous. For instance, if a value for a field remains constant between a plurality of frames, that field may be removed from frames where it is unchanged, and the server may treat a frame that lacks a particular field as having that field with the same value as the frame that precedes it. Examples of fields that may be included in a frame may include a pointer event type (e.g. touch), an identifier for a contact, a timestamp, a coordinate of the contact, an event type (e.g., DOWN, UP, or UPDATE), a contact rectangle, a contact orientation (e.g., 0 to 360 degrees), and a pressure with which the contact is made.

Operation 608 depicts establishing a TCP connection with the server computer. The TCP connection may be used to transport the main remote presentation session channel data, such as graphics sent from the server to the client, and keyboard, mouse and pen input data sent from the client to the server. A TCP connection may be established, for instance, while initializing a remote presentation session, by the client computer sending an indication of such to the server computer at a port that a remote presentation session process executing on the server computer is executing on. A TCP connection differs from a UDP connection in that sent data is guaranteed to be delivered, and presented to the recipient in the order in which it was sent. As a result of these additional features offered by a TCP connection, a TCP connection generally involves a larger latency in transmission than does a UDP connection.

Operation 610 depicts receiving a second input indicative of mouse, keyboard, or pen input made locally to the client computer. This may be similar to how input PAL 302 of FIG. 3 receives mouse messages.

Operation 612 depicts sending an indication of the second input to a process executing in system space of the server computer via the TCP connection. In embodiments, the process executes in system space on the server, and injects the second input into the user session, the user session then performing processing corresponding to the second input.

While the present invention has been described in connection with the preferred aspects, as illustrated in the various figures, it is understood that other similar aspects may be used or modifications and additions may be made to the described aspects for performing the same function of the present disclosure without deviating there from. Therefore, the present disclosure should not be limited to any single aspect, but rather construed in breadth and scope in accordance with the appended claims. For example, the various procedures described herein may be implemented with hardware or software, or a combination of both. The invention may be implemented with computer-readable storage media and/or computer-readable communication media. Thus, the invention, or certain aspects or portions thereof, may take the form of program code (i.e., instructions) embodied in tangible media, such as floppy diskettes, CD-ROMs, hard drives, or any other machine-readable storage medium. Likewise, the invention, or certain aspects or portions thereof, may be embodied in propagated signals, or any other machine-readable communications medium. Where the program code is loaded into and executed by a machine, such as a computer, the machine becomes an apparatus configured for practicing the disclosed embodiments. In addition to the specific implementations explicitly set forth herein, other aspects and implementations will be apparent to those skilled in the art from consideration of the specification disclosed herein. It is intended that the specification and illustrated implementations be considered as examples only.

What is claimed:

1. A method for remoting multi-touch input in a remote presentation session between a remote presentation client computer and a remote presentation server computer that serves the remote presentation session comprising graphical output from a user session, comprising:
    establishing the remote presentation session connection with the remote presentation server computer, wherein the remote presentation session connection comprises a Transmission Control Protocol (TCP) connection and a User Datagram Protocol (UDP) connection, the TCP connection being used to receive graphical presentation output from the user session running on the remote presentation server computer;
    receiving, by the client computer, multi-touch input indicative of a user multi-touching a multi-touch-sensitive input device made locally to the client computer;
    sending an indication of the multi-touch input to a process executing in the user session of the server computer via the UDP connection;
    receiving via the TCP connection graphical presentation output generated by the server computer performing processing corresponding to the multi-touch input;
    receiving, by the client computer, a second input indicative of mouse, keyboard, or pen input made locally to the client computer; and
    sending an indication of the second input to a process executing in system space of the server computer via the TCP connection, the process executing in system space injecting the second input into the user session, the user session performing processing corresponding to the second input.

2. The method of claim 1, wherein the multi-touch input comprises a plurality of frames of multi-touch data, further comprising:
    determining that the multi-touch input indicated by two consecutive frames of the plurality of frames is identical; and
    wherein sending an indication of the multi-touch input comprises:
        sending an indication of only one of the two consecutive frames.

3. The method of claim 2, wherein sending an indication of the input to a process executing in the user session of the server computer, the server computer performing processing corresponding to the input comprises:
    the server computer injecting a keep alive indication into the user session in response to determining that a period of time since a time indicated by a frame of the plurality of frames is above a threshold.

4. The method of claim 1, wherein the multi-touch input comprises a plurality of contacts, and further comprising:
    mapping each contact from a first address space to a second address space, the second address space being smaller than the first address space.

5. The method of claim 4, further comprising:
    in response to determining that the number of contacts in the plurality of contacts is greater than a maximum number of allowed contacts, determining to send the server only multi-touch input corresponding to a number of contacts equal to the maximum number of allowed contacts.

6. The method of claim 1, further comprising:
establishing, by the client computer, a remote presentation session with the server computer, the server computer disabling graphical multi-touch feedback on the server computer.

7. The method of claim 1, wherein the multi-touch input comprises a plurality of frames of multi-touch data, further comprising:
marking each frame of the plurality of frames with one of the relative timestamps indicative of a time at which the frame of input was made by the user.

8. The method of claim 7, wherein each relative timestamp is indicative of a time at which the frame of input was made by the user relative to when the most recent frame of the plurality of frames was made by the user or the oldest frame of the plurality of frames was made by the user.

9. The method of claim 8, further comprising marking each frame of the plurality of frames with one of the relative timestamps by replacing an absolute timestamp of each frame of the plurality of frames with the relative timestamp.

10. The method of claim 1, wherein receiving, by the client computer, multi-touch input indicative of a user multi-touching a multi-touch-sensitive input device made locally to the client computer comprises:
receiving an indication of a pressure with which the user multi-touched the multi-touch-sensitive input device.

11. A system for remoting multi-touch input in a remote presentation session between a remote presentation client computer and a remote presentation server computer that serves the remote presentation session comprising graphical output from a user session, comprising:
a processor; and
a memory communicatively coupled to the processor when the system is operational, the memory bearing processor-executable instructions that, when executed on the processor, cause the system to at least:
establish a remote presentation session connection with the server computer, wherein the remote presentation session connection comprises a reliable connection established using a reliable data transport protocol and an unreliable connection established using an unreliable data transport protocol, the reliable connection being used to receive graphical presentation output from the user session running on the server computer;
receive multi-touch input indicative of a user multi-touching a multi-touch-sensitive input device made locally to the client computer;
send an indication of the multi-touch input to a process executing in the user session of the server computer via the unreliable connection; and
receive via the reliable connection graphical presentation output generated by the server computer performing processing corresponding to the multi-touch input.

12. The system of claim 11, wherein the memory further bears processor-executable instructions that, when executed on the processor, cause the system to at least:
receive a second input indicative of mouse, keyboard, or pen input made locally to the client computer; and
send an indication of the second input to the server computer via the reliable connection, the server computer performing processing corresponding to the second input, wherein the reliable connection is a Transmission Control Protocol (TCP) connection.

13. The system of claim 12, wherein the processor-executable instructions, that when executed on the processor, cause the system to at least send an indication of the second input to the server computer via the reliable connection further cause the system to at least:
send the indication of the second input to a process executing in system space of the server computer, the process executing in system space injecting the second input into the user session.

14. The system of claim 11, wherein the processor-executable instructions, that when executed on the processor, cause the system to at least receive multi-touch input indicative of a user multi-touching a multi-touch-sensitive input device made locally to the client computer further cause the system to at least:
receive an indication of an orientation with which the user multi-touched the multi-touch-sensitive input device.

15. The system of claim 11, wherein the processor-executable instructions, that when executed on the processor, cause the system to at least receive multi-touch input indicative of a user multi-touching a multi-touch-sensitive input device made locally to the client computer further cause the system to at least:
receive an indication of a rectangular area formed by a contact point of the user on the multi-touch-sensitive input device.

16. The system of claim 11, wherein the memory further bears processor-executable instructions that, when executed on the processor, cause the system to at least:
send an indication that the system supports multi-touch input, the server computer initializing the process in the user session in response to receiving the indication that the client computer supports multi-touch input.

17. The system of claim 11, wherein the multi-touch input comprises a plurality of frames, and wherein the memory further bears processor-executable instructions that, when executed on the processor, cause the system to at least:
determine a field of each frame of the plurality of frames not needed by the server computer to process the multi-touch input; and
remove the field from each frame.

18. The system of claim 11, wherein the multi-touch input comprises a plurality of frames, and wherein at least one frame of the plurality of frames includes a field, and wherein the memory further bears processor-executable instructions that, when executed on the processor, cause the system to at least:
determine that the field of the at least one frame represents the same value as the field of a frame possessed by the server computer; and
remove the field from the at least one frame before sending the indication of the input to the process executing in the user session of the server computer.

19. The system of claim 11, wherein the multi-touch input comprises a plurality of frames, and wherein the memory further bears processor-executable instructions that, when executed on the processor, cause the system to at least:
determine that the multi-touch input indicated by two consecutive frames of the plurality of frames is identical; and
wherein the instructions that, when executed on the processor, cause the system to at least send an indication of the multi-touch input further cause the system to at least:
send an indication of only one of the two consecutive frames.

20. A computer-readable storage medium for remoting multi-touch input in a remote presentation session with a remote presentation server computer that serves the remote presentation session comprising graphical output from a user session, bearing computer-readable instructions that, when executed on a computer, cause the computer to perform operations comprising:

establishing the remote presentation session with the remote presentation server computer, wherein the remote presentation session comprises a reliable connection established using a reliable data transport protocol and an unreliable connection established using an unreliable data transport protocol, the reliable connection being used to receive graphical presentation output from the user session running on the remote presentation server computer;

receiving multi-touch input indicative of a user multi-touching a multi-touch-sensitive input device made locally to the client computer;

sending an indication of the multi-touch input to the server computer via the unreliable connection of the remote presentation session; and receiving, via the reliable connection of the remote presentation session, graphical presentation output generated by the server computer performing processing corresponding to the multi-touch input.

\* \* \* \* \*